Figure 1:
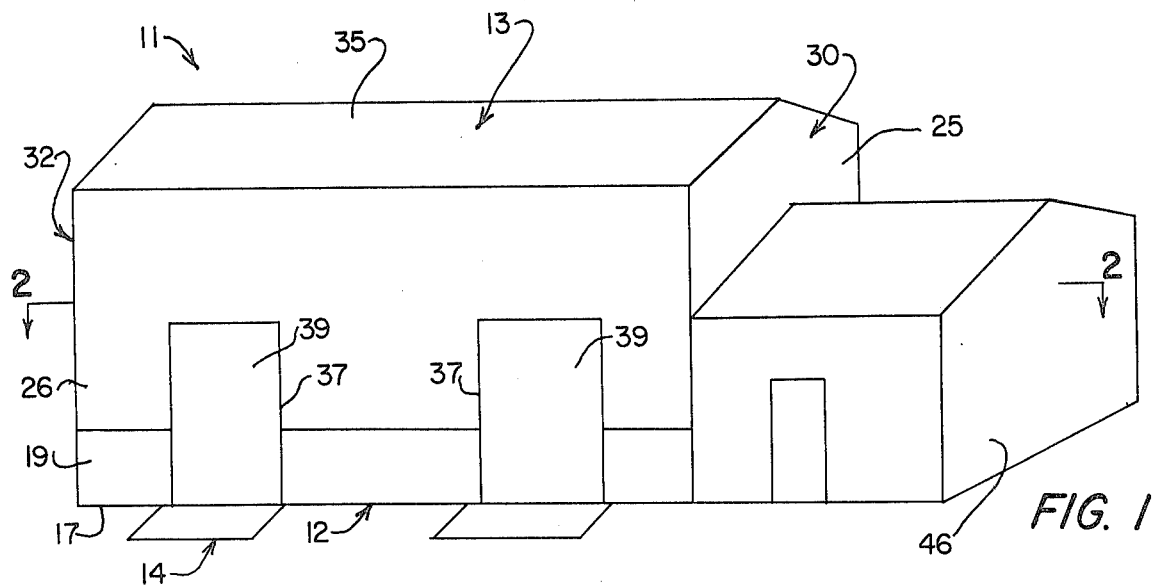

United States Patent [19]

Rose et al.

[11] Patent Number: 4,473,532
[45] Date of Patent: Sep. 25, 1984

[54] ORE LEACHING STRUCTURE

[76] Inventors: Shirley M. Rose; William R. Rector, both of 5668 Birdseye Rd., Helena, Mont. 59601

[21] Appl. No.: 325,651

[22] Filed: Nov. 30, 1981

[51] Int. Cl.³ ............................................ B01D 11/02
[52] U.S. Cl. .................................. 422/261; 134/198; 266/101; 266/134; 266/142; 266/168; 422/263; 422/281
[58] Field of Search ............... 422/261, 263, 281, 284; 266/101, 114, 134, 142, 170, 171, 168; 134/198; 98/115 SB; 55/238; 209/178; 261/DIG. 11

[56] References Cited

U.S. PATENT DOCUMENTS

| | | | |
|---|---|---|---|
| 449,813 | 4/1891 | Cragg | 422/261 X |
| 1,139,428 | 5/1915 | MacDonald | 266/101 |
| 1,673,982 | 6/1928 | Kanda | 266/101 X |
| 2,174,645 | 10/1939 | Wetzel | 266/114 X |
| 2,727,734 | 12/1955 | Vincent | 134/198 X |
| 2,740,707 | 4/1956 | Herrmann | 422/261 X |
| 2,885,270 | 5/1959 | Karcher et al. | 422/261 X |
| 3,374,062 | 3/1968 | Bowdish | 422/261 X |
| 3,777,003 | 12/1974 | Mitterer | 422/261 X |

Primary Examiner—Richard L. Chiesa
Attorney, Agent, or Firm—Arthur L. Urban

[57] ABSTRACT

Ore leaching structure including a base portion, a shelter portion, a transfer portion and a treatment portion; the base portion including a peripheral concrete foundation, concrete wall sections extending upwardly therefrom, a concrete floor section extending between the wall sections, the floor section including at least one drain opening adjacent one wall section, the floor section being sloped from the other of the wall sections toward the drain opening; the shelter portion including vertical sections extending upwardly from the wall sections, the vertical sections and the wall sections together forming the sidewalls of the structure, a roof section extending between and joining the upper edges of the sidewalls; the transfer portion including a first group of doorways in a sidewall adjoining the sidewall along which the drain opening is located, the doorways being spaced along the length of the sidewall, a second group of doorways along a sidewall opposite to the first group of doorways, the doorways of the second group being aligned with the doorways of the first group, doors selectively covering the doorways; the treatment portion including conduits disposed below the roof section, a plurality of sprayheads associated with the conduits, the sprayheads being arranged substantially uniformly with respect to the floor section, equipment for providing liquid to the sprayheads, and equipment for collecting liquid from the drain opening.

7 Claims, 3 Drawing Figures

U.S. Patent    Sep. 25, 1984    4,473,532

ORE LEACHING STRUCTURE

This invention relates to a novel structure and more particularly relates to a new structure for the treatment of ores.

For many centuries, man has attempted to obtain metals and other substances from mineral deposits. Originally, man looked for rock formations from which pure metals could be physically separated easily. Later, methods were developed for treating ores to recover metal components that were not readily separable. One common method involves the heating of the ores to liquify the metals so they will flow from the rocks.

Another method involves the treatment of the ore with chemicals to dissolve or leach the metals therefrom. Through the years, chemical leaching has been widely used for the recovery of precious metals such as gold, silver and the like. Chemical leaching is especially widespread in commercial operations because of the minimum capital investment required.

Although the utilization of chemical ore leaching is common, it is not without problems. One difficulty is that poisonous and/or noxious chemicals frequently are required to achieve the desired leaching. For example, for gold recovery, it is customary to employ cyanides which are extremely hazardous to human beings. Thus, special precautions must be taken to insure that workers and people in the surrounding area do not come into contact with the chemicals.

A further problem is achieving a high level of productivity of the leaching operation under the varying conditions of ore treatment. Since very large quantities of ore yield only small amounts of metal, it is necessary to treat many tons of ore to make an operation economically feasible. Because of the large quantities of ore that must be treated, a common leaching method is so-called pad leaching. This method involves the treatment of piles of ore in the open by allowing the chemicals to flow through the piles.

While open leaching may be efficient during a part of the year, it may not be practical at other times. The normal changes in temperature with the seasons in many geographical areas may result in a serious and unacceptable reduction is productivity. Some chemicals have slow reaction rates under certain conditions such as low temperatures, etc. This requires long exposure times of the chemicals with the ores.

From the above discussion, it is clear that present procedures for recovering metals and other substances from ores do not provide acceptable solutions in many situations. Thus, there is a need for new means that do not have the shortcomings of present methods.

The present invention provides a novel ore leaching structure. The leaching structure of the present invention enables leaching to be conducted with a high degree of efficiency. The ore leaching structure facilitates maximizing the producitivty of the leaching operation. Also, the use of the structure provides a high return on investment.

The ore leaching structure of the present invention is simple in design and can be fabricated at a relatively low cost. The structure can be constructed from commercially available materials and components. Conventional industrial building erection techniques and procedures can be employed in its fabrication. The leaching structure of the invention is durable in construction and has a long, useful life. Little maintenance is required to keep the structure in operating condition.

The leaching structure of the invention enables ore leaching to be conducted by semi-skilled labor after only a minimum of instruction. The design of the structure facilitates confinement of hazardous chemicals from the surrounding area and particularly the exposure of workers thereto.

Figure 2:
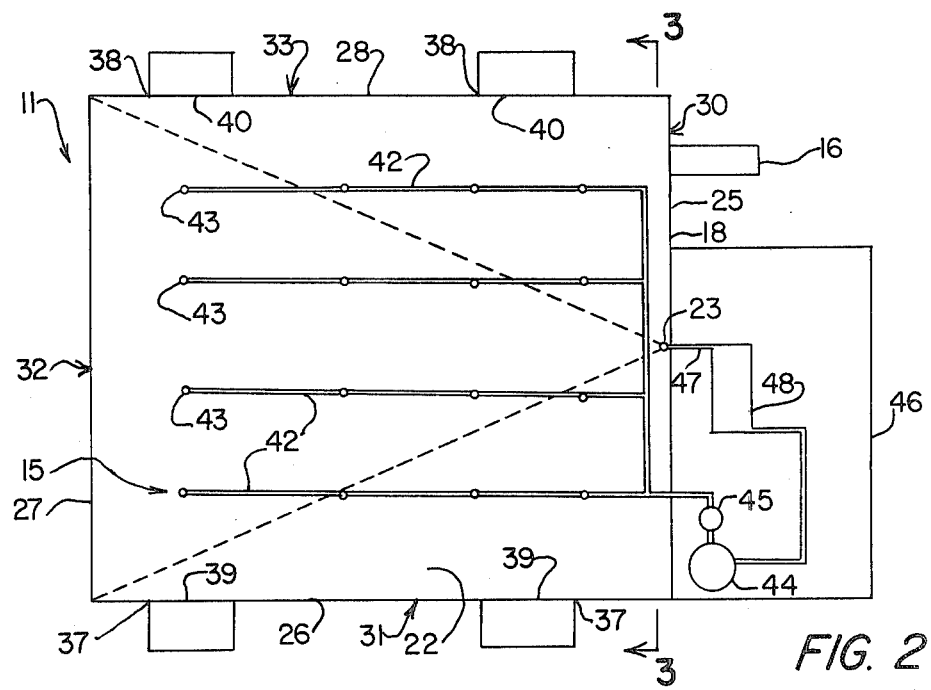
Figure 3:
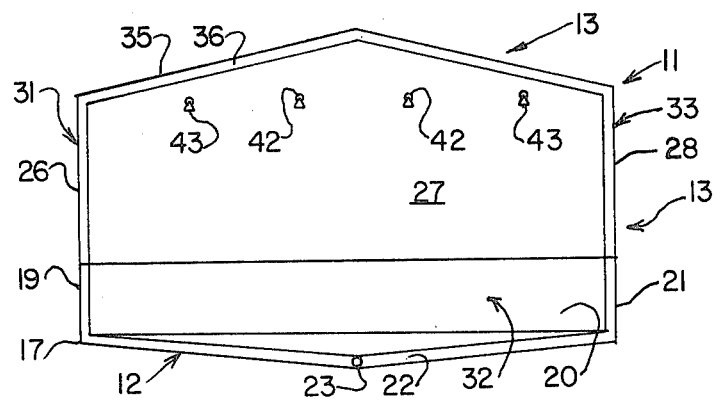

These and other benefits and advantages of the novel ore leaching structure of the present invention will be apparent from the following description and the accompanying drawings in which:

FIG. 1 is a view in perspective of one form of the ore leaching structure of the invention;

FIG. 2 is a sectional view of the ore leaching structure shown in FIG. 1 taken along line 2—2 thereof; and FIG. 3 is a sectional view of the ore leaching structure shown in FIGS. 1 and 2 taken along line 3—3 of FIG. 2.

As shown in the drawings, one form of the novel ore leaching structure 11 of the present invention includes a base portion 12, a shelter portion 13, a transfer portion 14 and a treatment portion 15. The ore leaching structure 11 advantageously has a base portion with a generally rectangular configuration. Preferably, the structure 11 also includes means such as heating and/or cooling means 16 for controlling the atmosphere therein.

The base portion 12 of the leaching structure 11 includes a peripheral concrete foundation 17. Concrete wall sections 18, 19, 20 and 21 extend upwardly from the peripheral foundation 17. The wall sections 18-21 advantageously extend upwardly from the foundation a significant distance, e.g. several feet and preferably about three feet or more.

The base portion 12 also includes a concrete floor section 22. The floor section 22 extends between and connects the wall sections 18-21. The floor section 22 includes at least one drain opening 23 adjacent one wall section 18. The floor section 22 slopes from the other wall sections 19, 20 and 21 toward the drain opening 23.

The shelter portion 13 of the leaching structure 11 of the invention includes vertical sections 25, 26, 27 and 28. The vertical sections 25-28 extend upwardly from the wall sections 18-21 respectively of the base portion 12. The vertical sections 25-28 and the complementary wall sections 18-21 together form the sidewalls 30, 31, 32 and 33 of the structure 11.

The shelter portion 13 further includes a roof section 35. The roof section 35 extends between and connects the upper edges of the sidewalls 30-33. Advantageously, the shelter portion including insulating layers 36. The shelter portion preferably is formed of metal panels.

The transfer portion 14 of the ore leaching structure 11 includes a first group of doorways 37 in sidewall 31 adjoining the sidewall 30 along which the drain opening 23 is located. The doorways 37 are spaced along the length of the sidewall 31, preferably with substantially equal spacing.

A second group of doorways 38 are located along a sidewall 33 opposite to the sidewall 31 in which the first group of doorways 37 are located. The doorways 38 of the second group are aligned generally with the doorways 37 of the first group. Means shown as doors 39 and 40 selectively cover the doorways 37 and 38.

The treatment portion 15 of the structure 11 includes conduit means 42. The conduits 42 are disposed adjacent to and below the roof section 35. A plurality of spray means 43 are associated with the conduits 42. Sprayheads 43 may be spaced substantially uniformly with respect to the floor section 22. This arrangement provides uniform distribution over the floor area of the structure. The sprayheads 43 advantageously may be arranged in a series of rows as shown in the drawings. Means may be provided for adjusting the spacing of the sprayheads from the floor section 22.

The treatment portion of the structure 11 also may include means for providing liquid to the sprayheads 43 through the conduits 42. This may be accomplished with a liquid storage tank 44 and pump 45 which may be located in an adjacent annex or building 46. In addition, means are provided for collecting the liquid from the drain opening 23. This may take the form of a conduit 47 which connects to suitable equipment in annex 46.

In the use of the ore leaching structure 11 of the present invention as shown in the drawings, ore containing precious metals such as gold, silver and the like is crushed outside of structure 11 with conventional crushing machinery (not shown). Then, doors 39 in one sidewall 31 are opened and the crushed ore is transported into the structure 11 with suitable loading machinery such as front end loaders. Ore is moved into the structure and dumped on the floor 22 until it is piled over the complete floor area to a depth of several feet or more.

Water or another suitable liquid is sprayed from sprayheads 43 to soak the ore. When the ore is thoroughly saturated, a neutralizer liquid may be sprayed onto the ore for a period of time sufficient to achieve the desired pH. Then, the leaching liquid such as a cyanide solution stored in tank 44 is transferred by pump 45 to sprayheads 43 and sprayed onto the neutralized ore. Spraying of the cyanide is continued until substantially all of the precious metals have been leached from the ore. The temperature within the structure during the leaching operation is controlled by heating and/or cooling equipment 16 to maximize the reaction rate of the cyanide solution with the metals within the ore.

To minimize the quantity of cyanide solution required to leach the metals from a load of ore, the cyanide solution collected by drain opening 23 may be circulated through conduit 47 to a metal recovery unit 48. For example, for the recovery of gold, a charcoal or zinc recovery unit may be employed. The cyanide solution exiting the recovery unit may be neutralized if necessary and then pumped back to the sprayheads 43 and the solution again sprayed onto the ore. This sequence can be continued until substantially all the precious metals have been removed from the ore.

The ore thereafter is sprayed with water again to remove any entrained chemicals therefrom. The doors 40 are opened and the leached ore removed with the loaders and transferred to a dump. The ore leaching operation may be repeated by loading fresh ore onto the floor 22 and initiating the leaching process. The precious metals in the recovery unit are reclaimed with conventional stripping, furnacing and electrowinning equipment.

The above description and the accompanying drawings show that the present invention provides a novel ore leaching structure with advantages and benefits not achieveable with leaching operations previously known. The ore leaching structure of the invention provides means for conducting ore leaching with a high degree of efficiency. The structure also enables the leaching operation to be highly productive. The ore leaching structure of the invention provides a high return on investment.

The leaching structure of the invention is simple in design and can be fabricated relatively inexpensively. Commercially available materials and components can be utilized in its fabrication. Conventional industrial building techniques and procedures can be employed in its erection. The structure is durable in construction and has a long useful life with little maintenance.

The ore leaching structure of the invention enables ore leaching to be conducted by semi-skilled labor after only a minimum of instruction. The leaching structure assists in minimizing exposure of workers to hazardous chemicals and facilitates confinement thereof.

It will be apparent that various modifications can be made in the particular ore leaching structure described in detail above and shown in the drawings within the scope of the invention. The size, configuration and arrangement of components can be changed to meet specific requirements. Also, the materials utilized in its construction can be different. These and other changes can be made in the structure of the invention provided the functioning and operation thereof are not deleteriously affected. Therefore, the scope of the invention is to be limited only by the following claims.

What is claimed is:

1. Ore leaching structure including a base portion, a shelter portion, a transfer portion and a treatment portion; said base portion including a peripheral concrete foundation, concrete wall sections extending upwardly therefrom, a crushed ore supporting concrete floor section extending between said wall sections, said floor section including at least one drain opening adjacent one wall section, said floor section being sloped from the other of said wall sections toward said drain opening; said shelter portion including vertical sections extending upwardly from said wall sections, said vertical sections and said wall sections together forming the sidewalls of said structure, a roof section extending between and joining the upper edges of said sidewalls; said transfer portion including a first group of crushed ore supplying doorways in a sidewall adjoining the sidewall along which said drain opening is located, said doorways of said first group being spaced along the length of said sidewall, a second group of leached ore removing doorways along a sidewall opposite to said first group of doorways, said doorways of said second group being aligned with said doorways of said first group, means for selectively covering said doorways; said treatment portion including conduit means disposed below said roof section, a plurality of spray means associated with said conduit means, said spray means being arranged substantially uniformly above crushed ore piled on said floor section to a depth of at least several feet, means for spraying liquid from said spray means to saturate said ore pile, and means for collecting liquid that has leached said ore pile from said drain opening.

2. Ore leaching structure according to claim 1 wherein said base portion has a generally rectangular configuration.

3. Ore leaching structure according to claim 1 including means for controlling the atmosphere in said structure.

4. Ore leaching structure according to claim 3 wherein said controlling means includes heating or cooling means.

5. Ore leaching structure according to claim 1 wherein said shelter portion is insulated.

6. Ore leaching structure according to claim 1 wherein said shelter portion is formed of metal.

7. Ore leaching structure according to claim 1 wherein said spray means are spaced sprayheads arranged in a series of rows.

* * * * *